United States Patent
Smith et al.

(10) Patent No.: US 6,378,279 B1
(45) Date of Patent: Apr. 30, 2002

(54) PIVOTING HYDRAULIC HOSE SUPPORT FOR AGRICULTURAL IMPLEMENTS

(75) Inventors: Garret H. Smith, New Holland; Terry A. Young, Lititz; Melanie W. Harkcom, New Holland; Carlos M. Maldonado, Akron, all of PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/616,230

(22) Filed: Jul. 14, 2000

(51) Int. Cl.[7] .............................................. A01D 34/03
(52) U.S. Cl. .................................... 56/15.5; 137/355.17
(58) Field of Search ...................... 56/15.5; 137/355.16, 137/355.17; 280/420, 421, 422; 248/75, 77, 79

(56) References Cited

U.S. PATENT DOCUMENTS

| | | | | |
|---|---|---|---|---|
| 2,626,552 A | * | 1/1953 | Oehler et al. | |
| 3,901,270 A | * | 8/1975 | Smith | |
| 4,002,357 A | * | 1/1977 | Bennett | |
| 4,234,012 A | | 11/1980 | Schupback | |
| 4,481,755 A | | 11/1984 | Carr | |
| 4,609,204 A | | 9/1986 | Nekola | |
| 4,632,626 A | | 12/1986 | O'Shea | |
| 5,082,217 A | | 1/1992 | Parker et al. | |
| 5,544,475 A | * | 8/1996 | Skibo | |
| 5,713,592 A | * | 2/1998 | Dunell | |
| 6,095,181 A | * | 8/2000 | Irwin | |

* cited by examiner

Primary Examiner—Thomas B. Will
Assistant Examiner—Meredith C. Petravick
(74) Attorney, Agent, or Firm—Larry W. Miller; John William Stader

(57) ABSTRACT

A crop harvesting implement operatively connected to a tractor having a wheeled frame, a draft tongue, a hydraulic cylinder interconnecting the frame and the draft tongue, a hydraulic cylinder interconnecting the frame and the draft tongue, and a hydraulic conduit system containing at least one flexible hose extending from the forward end of the draft tongue to the tractor, is provided with a hydraulic hose support pivotally mounted on the forward end of the draft tongue to support the flexible hoses at a position forward of the draft tongue. The pivoted hose support is mounted in a pivot bracket that is fixed to the forwardmost end of the draft tongue. The pivoted hose support includes a vertical portion defining a generally vertical pivot axis about which the hose support can rotatably move in conjunction with the pivoting motion of the draft tongue relative to the tractor and frame. The pivoted hose support also includes a support portion that projects away from the draft tongue and a hose clamping bracket that fixes the flexible hoses to the pivoted hose support.

13 Claims, 4 Drawing Sheets

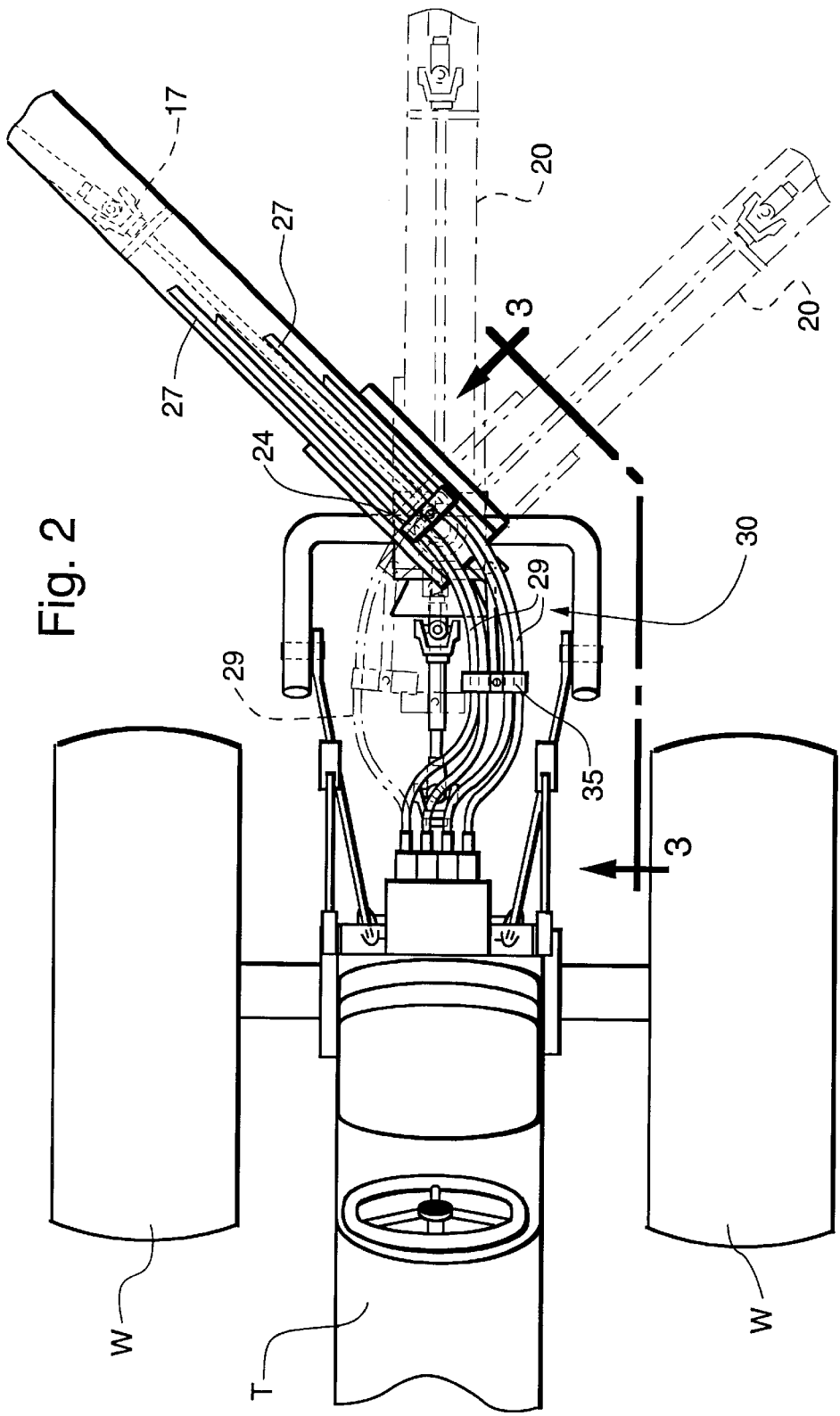

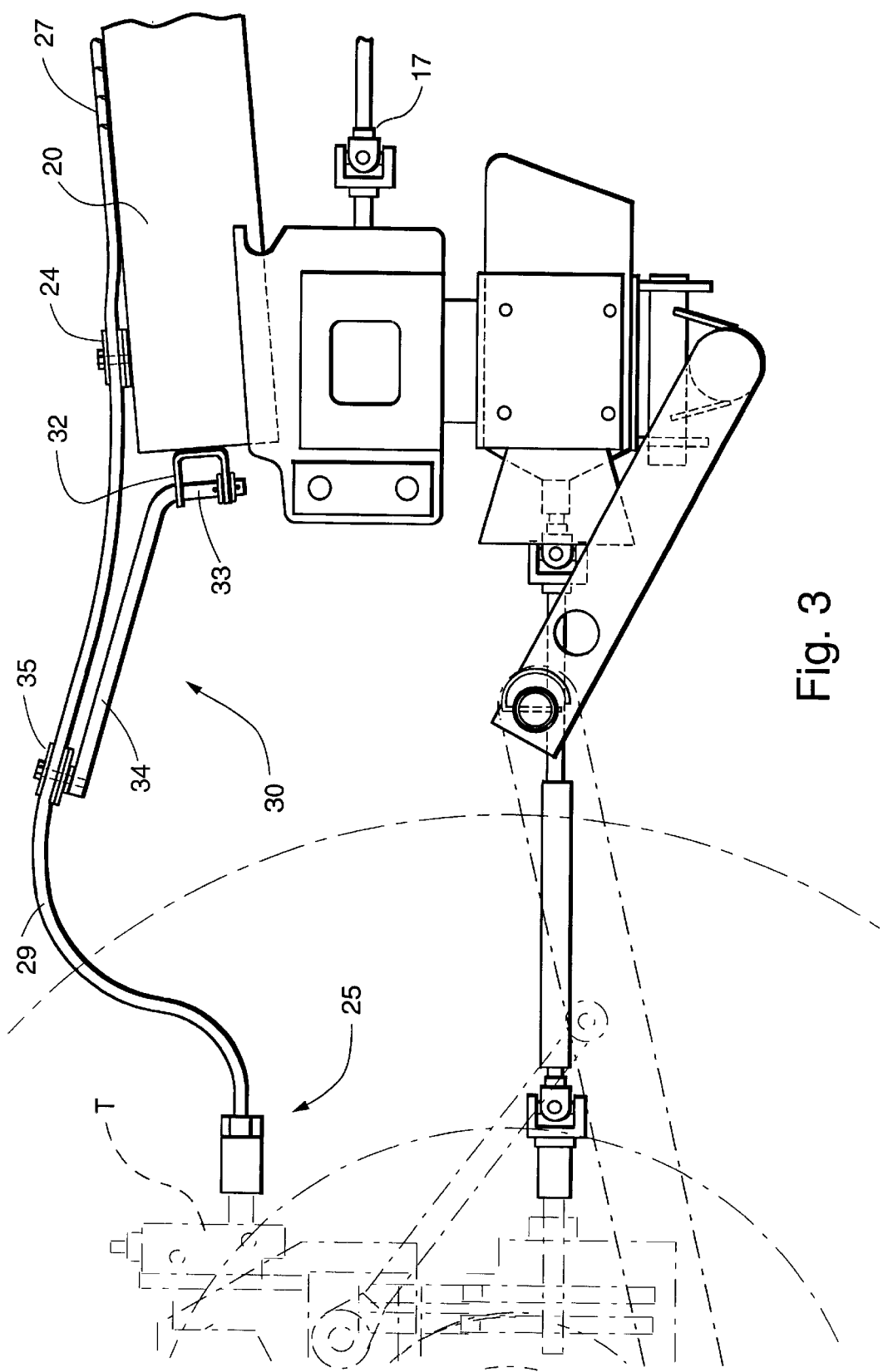

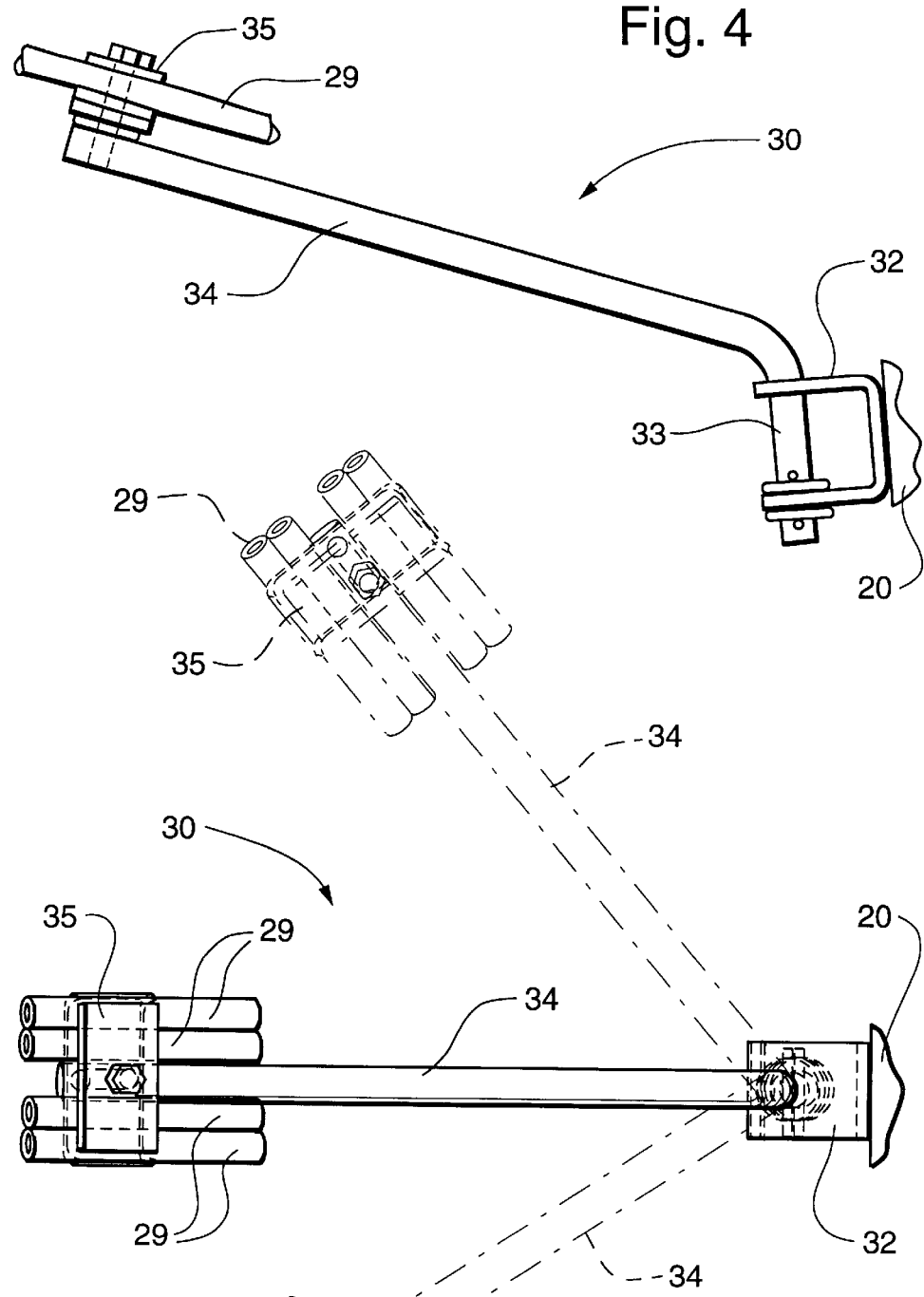

PIVOTING HYDRAULIC HOSE SUPPORT FOR AGRICULTURAL IMPLEMENTS

FIELD OF THE INVENTION

The present invention relates generally to hydraulically operated implements. In particular, this invention relates to supports for hydraulic hoses carried by the tongue of a pull-type harvesting implement.

BACKGROUND OF THE INVENTION

Pull-type harvesting implements have been utilized for various harvesting operations for many years. These harvesting implements, supported primarily by ground engaging wheels, are made in a variety of configurations, but normally include components supported on a frame. One of these components is a pivotal draft member, commonly called a drawbar or a draft tongue. For convenience, any draft member discussed in the following description will be referred to as a draft tongue.

In pull-type harvesting implements, the draft tongue is pivotally mounted to the frame and is connected at the forward end to a tractor that provides both motive power and operational power to operate the crop harvesting header. The tractor also provides a source of hydraulic fluid under pressure from a conventional on-board hydraulic system carried by most modern tractors. The hydraulic fluid is needed to provide operative power for hydraulic components on the harvesting implement. For example, in pull-type harvesting implements, the pivotal movement of the draft tongue is controlled by a hydraulic swing cylinder interconnecting the frame and the rearward portion of the draft tongue, which is powered hydraulically by the tractor. Further, hydraulic lift cylinders and hydraulic tilt cylinders are additional hydraulic components that control the height and pitch of the crop harvesting header relative to the ground.

The hydraulic fluid is typically transported to and from the harvesting implement via a hydraulic conduit system that includes at least one flexible hose that extends from the forward end of the draft tongue to the tractor for connection to the tractor's hydraulic system. The flexible hoses are typically only clamped for support thereof at the forward end of the draft tongue by a hose clamping bracket.

When the harvesting implement is in operation, the hydraulic swing cylinder is actuated, thereby causing the draft tongue to pivot about the forward end of the draft tongue connected to the tractor. Due to the large range of motion of the draft tongue relative to the tractor, the flexible hoses are subjected to considerable bending action at the forwardmost end of the draft tongue. In particular, the clamping of the hoses at the forward end of the draft tongue causes all of the bending of the flexible hoses to take place at a location immediately forward of the hose clamping bracket. As the draft tongue is pivoted, i.e., as the farm implement is swung to one side or other of the tractor, the bending action of the flexible hoses increases. This severe bending action causes a crimp in the flexible hoses, which results in a constriction of the opening in the flexible hoses, an increased pressure inside the flexible hoses, and overall wear and tear of the flexible hoses.

Additionally, because of the large pivotal movement of the draft tongue for centrally pivoted implements, the flexible hoses must be of a sufficient length for the draft tongue to pivot relative to the tractor. In conventional systems, extra length is provided to the flexible hoses to accommodate the wide range of motion of the draft tongue. However, this extra length could result in the hoses extending downwardly far enough to rub on the power-take-off driveline (PTO) during normal field positions, thereby causing excessive wear and tear on the hoses. Some manufacturers solve this problem by supporting the flexible hoses on a fixed support that extends forwardly and vertically from the top of the draft tongue. However, such a fixed support moves the bending point of the flexible hoses forward, and there is not enough length for the draft tongue to turn relative to the tractor.

SUMMARY OF THE INVENTION

Accordingly, an important object of the present invention is to provide a crop harvesting implement that overcomes the above mentioned problems encountered in the prior art.

It is another object of this invention to provide a crop harvesting implement that provides a pivoted hose support at the forward end of the draft tongue.

It is a feature of this invention that the pivoted hose support is mounted in a pivot bracket to the forwardmost end of the draft tongue.

It is another feature of this invention that the pivoted hose support includes a vertical portion which defines a generally vertical pivot axis about which the hose support can rotatably move in conjunction with the pivoting motion of the draft tongue relative to the tractor and the harvesting implement.

It is yet another feature of this invention that the pivoted hose support includes a hose clamping bracket that fixes the hoses to the hose support.

It is an advantage of the present invention that the rotation of the pivoted hose support allows the hoses to have less bending action.

It is another advantage of this invention that hydraulic hoses used to connect pull-type harvesting implements to a tractor will have a longer life.

It is yet another object of this invention to provide a pivoted hose support that extends upwardly and vertically from the forwardmost end of the draft tongue.

It is still another feature of this invention that the pivoted hose support elevates the flexible hydraulic hoses above the power-take-off driveling (PTO).

It is still another feature of this invention to provide a pivoted hose support for a pull-type harvesting implement which is durable in construction, inexpensive to manufacture, easy to maintain, easy to assemble, and simple and effective to use.

These and other objects, features, and advantages are accomplished according to the present invention by providing a crop harvesting implement operatively connected to a tractor to receive operative power therefrom and having a wheeled frame, a draft tongue pivotally connected to the frame and which extends forwardly from the frame to connect with the tractor, a hydraulic cylinder interconnecting the frame and the draft tongue to control the pivotal movement of the draft tongue relative to the frame, a hydraulic cylinder interconnecting the frame and the draft tongue to control the pivotal movement of the draft tongue relative to the frame, a hydraulic conduit system containing at least one flexible hose extending from the forward end of the draft tongue to the tractor, the hydraulic conduit system being operatively interconnected to the tractor and the hydraulic cylinder to provide a source of hydraulic fluid under pressure from the tractor to the hydraulic cylinder to control the operation of the hydraulic cylinder, and a hydraulic hose support pivotally mounted on the forward end of the draft tongue to support the flexible hoses at a position forward of the draft tongue. The pivoted hose support is mounted in a pivot bracket that is fixed to the forwardmost end of the draft tongue. The pivoted hose support includes a vertical portion defining a generally vertical pivot axis about which the hose support can rotatably move in conjunction with the pivoting motion of the draft tongue relative to the tractor and frame. The pivoted hose support also includes a support portion that projects away from the draft tongue and a hose clamping bracket that fixes the flexible hoses to the pivoted hose support.

BRIEF DESCRIPTION OF THE DRAWINGS

The foregoing and other objects, features, and advantages of the invention will appear more fully hereinafter from a consideration of the detailed description that follows, in conjunction with the accompanying drawings. It is to be expressly understood, however, that the drawings are for illustrative purposes and are not to be construed as defining the limits of the invention.

FIG. 2 is an enlarged partial top plan view similar to that of FIG. 1, showing the connection of the draft tongue to the tractor.

FIG. 3 is a side elevational view corresponding to lines 3—3 of FIG. 2 to depict the forward end of the draft tongue and the pivoted hose support bracket mounted thereto, the tractor being shown in phantom.

FIG. 4 is an enlarged side elevational view depicting the pivoted hose support affixed to the forward end of the draft tongue.

FIG. 5 is a top plan view of the pivoted hose support shown in FIG. 4, the pivotal movement of the hose support being shown in phantom.

DETAILED DESCRIPTION OF THE PREFERRED EMBODIMENTS

Figure 1:
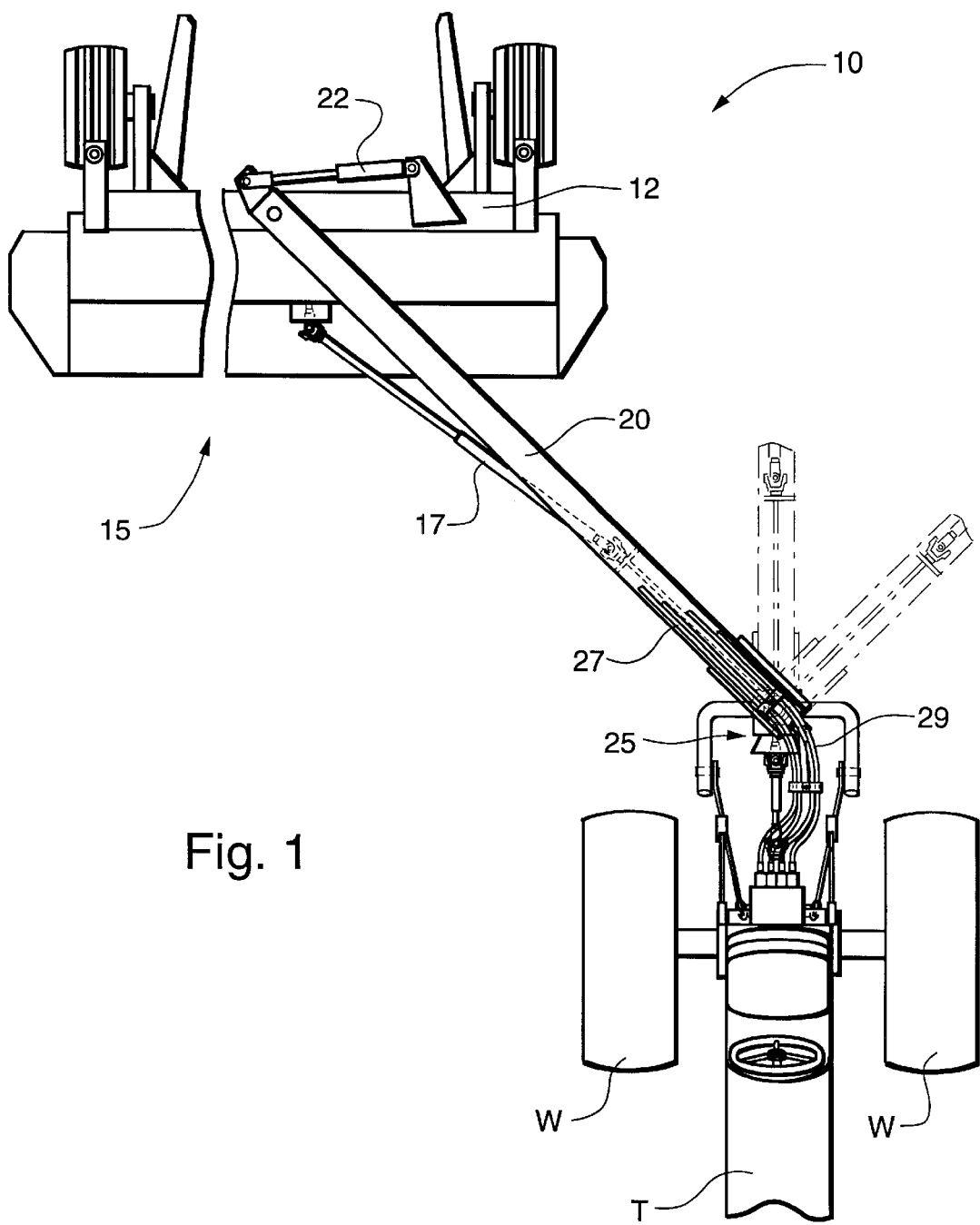
FIG. 1 is a top plan view representing a hay harvesting implement incorporating the principals of the instant invention, the implement being connected to a tractor to provide operative power thereto. The movement of the draft tongue of the implement is depicted in phantom, and portions of the tractor and the implement are broken away for purposes of clarity.

Referring to FIGS. 1 and 2, a mower-conditioner incorporating the principals of the instant invention can be seen. The mower-conditioner 10, exemplary of pull-type hay harvesting implements, includes a wheeled frame 12 adapted for movement over the field to harvest hay crop. A crop harvesting header 15 is mounted on the forward portion of the frame 12 to engage standing crop material, sever the crop material from the ground, and further harvest the severed crop material by conditioning the hay crop before discharging the conditioned crop to the ground behind the wheeled frame 12.

Pull-type harvesting implements 10 utilize a draft tongue 20 that is pivotally mounted at the rearward end thereof to the frame 12 and connected at the forward end thereof to a tractor T that provides both motive power and operational power to operate the crop harvesting header 15. The tractor T also provides a source of hydraulic fluid under pressure from a conventional on-board hydraulic system carried by most modern tractors T. The hydraulic fluid under pressure is needed to provide operative power for hydraulic components on the implement 10. For example, the pivotal movement of the pivoted draft tongue 20 is controlled by a hydraulic swing cylinder 22 interconnecting the frame 12 and the rearward portion of the tongue 20. Other conventional examples of hydraulically controlled components include hydraulic lift cylinders (not shown) that control the height of the crop harvesting header 15 relative to the ground and a hydraulic tilt cylinder (not shown) that interconnects the frame 12 and the top of the crop harvesting header 15 to control the pitch of the header relative to the ground.

The implement 10 is typically provided with a hydraulic fluid conduit system 25 including hoses 29 interconnecting the on-board tractor hydraulic system and the hydraulic components 22 of the implement 10 to provide flow communication therebetween. Typically, the conduit system 25 includes fixed length rigid pipes 27 mounted on top of the draft tongue 20. Flexible hoses 29 are typically connected to the ends of the pipes 27 to provide appropriate flow communication connection at each respective end of the pipes 27. An alternative configuration would be for the flexible hoses 29 to extend over top of the draft tongue 20, eliminating the fixed length pipes.

In operation, the pivotal movement of the draft tongue 20, as best seen in FIGS. 1–3, requires the actuation of the hydraulic swing cylinder 22 located on the wheeled frame 12. More specifically, the change in the amount of hydraulic fluid in one side of the hydraulic swing cylinder 22 relative to the other side of the hydraulic swing cylinder 22 via the hydraulic fluid conduit system 25 causes the draft tongue 20 to pivot about the connection between the frame 12 and the draft tongue 20, resulting in a pivotal movement at the forward end of the draft tongue 20. The angular movement created at the forward end of the draft tongue 20 relative to the tractor T can be over 90 degrees to the left and to the right of the tractor T, depending on the size and location of the tires W of the tractor T versus the draft tongue 20. Thus, a total range of motion of the draft tongue 20 relative to the tractor T can exceed 180 degrees.

At the forward end of the draft tongue 20 next to the tractor T, the hoses 29 are subjected to considerable bending action due to this substantial angle of pivotal movement of the draft tongue 20 relative to the tractor T. Further complicating the problem associated with the bending of the flexible hoses 29 at the forward end of the draft tongue 20 is that the conduits 27 and 29 are usually clamped by a first hose clamping bracket 24 adjacent the very forward end of the draft tongue 20. This clamping by the first hose clamping bracket 24 forces all bending action of the flexible hoses 29 to take place at a location immediately forward of the first hose clamping bracket 24, thereby creating a crimp in the hoses as the draft tongue 20 is pivoted relative to the tractor T. This crimping results in a constriction of the opening through the flexible hoses 29 which restricts the flow of hydraulic fluid to be delivered to the hydraulic swing cylinder 22 via the hydraulic fluid conduit system 25. Additionally, the constriction increases the pressure inside the flexible hoses 29.

To facilitate the bending action required of the flexible hoses 29, a pivoted hose support 30 is provided at the forward end of the draft tongue 20. Referring now to FIGS. 3–5, the details of the pivoted hose support 30 can best be seen. The hose support 30 is mounted in a pivot bracket 32 formed as a clevis which is fixed, such as by welding, to the very forwardmost end of the draft tongue 20. The hose support 30 includes a vertical portion 33 defining a generally vertical pivot axis about which the hose support 30 can rotatably move in conjunction with the pivoting motion of the draft tongue 20 relative to the tractor T and the frame 12 of the implement 10. Extending forwardly from the vertical portion 33 is an integral support portion 34 projecting away from the draft tongue 20. The distal end of the support portion 34 is provided with a second hose clamping bracket 35 which fixes the flexible hoses 29 to the hose support 30. Preferably, the second hose clamping bracket 35 is positioned near the midpoint between the forward end of the draft tongue 20 and the connection of the flexible hoses 29 to the hydraulic system 25 of the tractor T in order to generally equalize the bending action over the length of the flexible hoses 29.

As the draft tongue is pivoted, the pivoted hose support 30 rotates about the vertical portion 33. This pivoting of the hose support 30 allows the flexible hoses 29 to bend less at the location immediately forward of the first hose clamping bracket 24, thereby eliminating the severe bending action that occurs if the flexible hoses 29 are clamped only by a first hose clamping bracket 24. The spacing of the first hose clamping bracket 24 and the second hose clamping bracket 35, between which the flexible hoses 29 are bent, decreases the bending action that occurs in the flexible hoses 29. Specifically, the bending action of the flexible hoses 29 is shared between the first and second clamping brackets 24 and 35, resulting in less bending of the flexible hoses 29 at any one specific location.

In one preferred embodiment, the support portion 34 of the pivoted hose support 30 as described above extends generally upwardly and forwardly. In this embodiment, as shown in FIG. 4, the support portion 34 projects upwardly and away from vertical portion 33 as well as from the draft tongue 20. This keeps the flexible hoses 29 high enough to clear the power-take-off driveline (PTO) 17 while also allowing them to follow the tractor T. Additionally, the upward positioning of the support portion 34 of the pivoted hose support 30 allows for more hose length, and therefore a greater angle of the draft tongue 20 relative to the tractor T.

Of the many implicit and explicit advantages of the present invention, one of the most important is the rotational movement of the pivoted hose support 30 which provides for a reduction of the bending of the flexible hoses 29. Among other things, the rotation of the pivoted hose support 30 in the manner described above improves the range of motion of the harvesting implement 10 with respect to the tractor T by reducing the bending action of the flexible hoses 29. Further, the reduction of the localized bending action in the flexible hoses 29 caused by the rotation of the pivoted hose support 30 increases the life of the flexible hoses 29 by eliminating the possible pressure buildup associated with the increased bending action that occurs if the flexible hoses 29 are clamped only by the first hose clamping bracket 24. Furthermore, the pivoted hose support 30 is simple and inexpensive to manufacture, maintain and operate.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A crop harvesting implement operatively connectable to a tractor to receive operative power therefrom, comprising:

a frame;
a draft tongue having a rearward end pivotally mounted on said frame and a forward end extending forwardly from said frame for connection with said tractor;
a hydraulic cylinder interconnecting said frame and said draft tongue to control the pivotal movement of said draft tongue relative to said frame;
a hydraulic conduit system operatively interconnecting said tractor and said hydraulic cylinder to provide a source of hydraulic fluid under pressure from said tractor to said hydraulic cylinder to control the operation thereof, said hydraulic conduit system including at least one flexible hose extending from said forward end of said draft tongue to said tractor; and
a hydraulic hose support pivotally mounted in a pivot bracket affixed to said forward end of said draft tongue to support said at least one flexible hose at a position forward of said draft tongue, said hose support including a vertical portion, received in said pivot bracket and defining a generally vertical pivot axis about which said hose support can rotatably move; a support portion projecting away from said draft tongue relative to said tractor; and a hose clamping bracket at the distal end of said hose support to fix at least on flexible hose to said hose support.

2. The crop harvesting implement of claim 1, wherein said pivot bracket is a clevis.

3. The crop harvesting implement of claim 1, wherein said support portion projects upwardly and forwardly from said draft tongue relative to said tractor.

4. The crop harvesting implement of claim 1, wherein said hose clamping bracket is affixed to the top of said hose support.

5. The crop harvesting implement of claim 1, wherein said hose clamping bracket is positioned substantially equidistantly between the forward end of said draft tongue and said tractor.

6. In a crop harvesting implement having a frame; a draft tongue pivotally connected at a rearward end to said frame, said draft tongue having a forward end adapted for connection to a tractor; a hydraulic cylinder interconnecting said frame and said draft tongue for effecting pivotal movement of said draft tongue relative to said frame; a hydraulic conduit system operably connectable to said tractor to receive a flow of hydraulic fluid under pressure therefrom and operably connected to said hydraulic system to effect operation thereof, said hydraulic conduit system including at least one flexible hose extending between said draft tongue and said tractor, the improvement comprising:

a pivoted hose support pivotally mounted on said forward end of said draft tongue to support said at least one flexible hose at a position between said draft tongue and said tractor, said pivoted hose support including a vertical portion defining a generally vertical pivot axis about which said pivoted hose support can rotatably move; a support portion projecting away from said draft tongue relative to said tractor; and a first hose clamping bracket at the distal end of said pivoted hose support to fix said at least one flexible hose to said pivoted hose support.

7. The crop harvesting implement of claim 6, wherein said at least one flexible hose is clamped to the forward end of said draft tongue by a second hose clamping bracket spaced from said first hose clamping bracket.

8. The crop harvesting implement of claim 7, wherein said vertical portion of said pivoted hose support is received in a pivot bracket mounted on the forward end of said draft tongue.

9. The crop harvesting implement of claim 8, wherein said support portion of said pivoted hose support projects upwardly and forwardly from said draft tongue toward said tractor.

10. The crop harvesting implement of claim 9, wherein said support portion of said pivoted hose support positions said second hose clamping bracket substantially midway between the forward end of said draft tongue and said tractor.

11. In a crop harvesting implement having a frame; a draft tongue pivotally connected at a rearward end to said frame, said draft tongue having a forward end adapted for connection to a tractor; a hydraulic cylinder interconnecting said frame and said draft tongue for effecting pivotal movement of said draft tongue relative to said frame; a hydraulic conduit system operably connectable to said tractor to receive a flow of hydraulic fluid under pressure therefrom and operably connected to said hydraulic system to effect operation thereof, said hydraulic conduit system including conduits mounted on said draft tongue by a first hose clamping bracket positioned at said forward end of said draft tongue and a flexible hose extending between said conduit and said tractor, an improved hose support mounted on said forward end of said draft tongue comprising:

a vertical portion defining a generally vertical pivot axis about which said hose support can rotate, said vertical portion being supported in a pivot bracket mounted on the forward end of said draft tongue;

a support portion integral with said vertical portion and projecting away from said draft tongue toward said tractor; and a second hose clamping bracket at the distal end of said support portion to fix said flexible hose to said hose support.

12. The crop harvesting implement of claim 11, wherein said support portion positions said second hose clamping bracket substantially midway between the forward end of said draft tongue and said tractor.

13. The crop harvesting implement of claim 12, wherein said support portion projects upwardly and forwardly from said vertical portion toward said tractor.

* * * * *